United States Patent [19]

Lach

[11] 3,961,239

[45] June 1, 1976

[54] SIGNAL CONDITIONING CIRCUIT FOR VEHICLE DIAGNOSTIC SYSTEM

[75] Inventor: Richard F. Lach, Hartford, Conn.

[73] Assignee: United Technologies Corporation, Hartford, Conn.

[22] Filed: Mar. 26, 1975

[21] Appl. No.: 562,388

[52] U.S. Cl. .................................. 324/15; 307/234; 307/247 A
[51] Int. Cl.² .................. G01R 13/42; G01R 23/00
[58] Field of Search ................. 324/15, 16 R, 16 T, 324/16 S; 73/116, 117.3, 118; 307/247 A, 268, 261, 234

[56] References Cited
UNITED STATES PATENTS

3,653,018    3/1972    Budrys ............................ 307/234

*Primary Examiner*—Robert J. Corcoran
*Attorney, Agent, or Firm*—Donald F. Bradley

[57] ABSTRACT

The rpm, dwell and timing of an internal combustion engine are measured by starting and stopping a digital counter on the leading edge of pulse waveforms generated either within the engine or by a timing light. To measure rpm and dwell only the low coil signal is used. For rpm measurement, the counter is started when the ignition points open, and stopped upon the next opening of the points. To measure dwell the counter is started by the opening of the points and stopped when the points close, the resultant count being the inverse of dwell, and this count is subtracted from the rpm count to obtain dwell. Timing is measured by starting the counter upon the firing of the number one cylinder, and providing an additional signal delayed in time as a function of the distributor advance to stop the counter. The count in the counter is converted to rpm, dwell or timing by either analog or digital techniques. A high energy ignition adapter circuit prevents triggering of the counter by a false indication of the opening of the points due to a waveform peculiar to low coil signals produced in vehicles using high energy ignition systems. A timing light delay circuit having a variable delay is incorporated with the timing light to produce the delayed signal proportional to distributor advance, the delay being adjustable within two selectable ranges. By measuring and displaying the computed dwell for each cylinder in sequence, distributor mechanical wear associated with shaft bearings and drive gears may be detected. Power contribution and dynamic relative compression for each cylinder may be measured by using the counter to measure the time that the points are open, and the time that the points are closed, for each cylinder in sequence, and displaying the measurements.

3 Claims, 11 Drawing Figures

SIGNAL CONDITIONING CIRCUIT FOR VEHICLE DIAGNOSTIC SYSTEM

BACKGROUND OF THE INVENTION

1. Field of the Invention

This invention relates to a vehicle diagnostic system, and particularly to an apparatus and method for determining the speed (rpm), dwell and timing of an internal combustion engine, as well as cylinder power contribution and distributor condition. Accurate information of these parameters is essential for tuning an engine to obtain maximum efficiency and minimum pollutant emissions, as well as for performing additional tests on the vehicle operation.

2. Description of the Prior Art

Motor vehicles are increasing in number, type and complexity. At the same time, mechanics who are adequately trained and technically up-to-date are becoming harder to find. Consequently, when vehicles are taken to a garage or service station for repairs, owners are faced with faulty or incomplete diagnosis, unnecessary replacements, return visits and dissatisfaction; dealers and manufacturers are faced with high warranty costs; and owners and fleet operators are faced with excessive vehicle downtime and higher than necessary repair costs.

In an attempt to reduce the problems associated with motor vehicle repairs, automated vehicle diagnostic systems are being developed which will permit diagnosis of vehicle condition by relatively unskilled personnel. Many such diagnostic systems simply display vehicle test parameters such as by oscilloscope waveforms or print-outs. Other diagnostic systems compare the vehicle test parameters with specification data supplied by the manufacturer. In both cases there is no attempt to diagnose a vehicle malfunction, and the analysis of the test data and determination of the required repair, if any, is left to the judgment of the mechanic or test operator. While such systems are satisfactory for obvious vehicle faults such as a defective cylinder, the output data is still subject to erroneous analysis and may result in unnecessary repairs.

Recently there has been developed a completely automated vehicle diagnostic system which not only displays the vehicle performance data and any deviations from vehicle specifications, but also diagnoses the malfunction and informs the test operator of the required repairs. This system, known as AUTOSENSE™ completely eliminates guesswork and unnecessary repairs, and the system can be used after the repairs are made to insure that the vehicle has been properly repaired.

The present invention forms a portion of the AUTOSENSE vehicle diagnostic system, and provides to the system signals indicative of vehicle rpm, and ignition system dwell and timing, as well as indicating distributor mechanical condition and the power contributed by each cylinder. These parameters are fundamental in determining the condition of the vehicle engine and ignition system, and knowledge of one or more of these parameters is necessary to determine other vehicle conditions.

SUMMARY OF THE INVENTION

It is an object of the present invention to provide a simple, accurate and reliable method and apparatus for measuring vehicle rpm and ignition timing and dwell.

Another object of the present invention is a system for measuring vehicle rpm, timing and dwell in which only the leading edge of selected ignition system voltage pulses is used to actuate a digital counter.

Another object of the present invention is a system for measuring vehicle rpm and dwell in which only the signal from the primary winding of the ignition coil is utilized.

Another object of the present invention is a novel signal conditioning circuit for the output signal from the primary winding of the ignition coil.

Another object of the present invention is a novel system for measuring vehicle ignition timing utilizing a timing light having an adjustable delay circuit for providing a variable delay to the timing signal.

Another object of this invention is a timing light delay circuit having a dual range to compensate for vehicle speed.

Another object of this invention is a novel high energy ignition adapter circuit for providing a voltage waveform at the exact time of firing of a spark plug.

Another object of this invention is a system for actuating a digital counter in response to pulses from the ignition coil, the number one cylinder and a timing light, and converting the count in the counter into signals indicative of rpm, dwell or timing in either an analog or digital manner.

Another object of this invention is a system for measuring and displaying the dwell for each cylinder in order to detect distributor malfunctions.

Another object of this invention is a system for obtaining the power contribution of each cylinder by measuring and displaying the average angular velocity, due to the acceleration and compression cycle of each cylinder.

In accordance to a preferred embodiment of the invention, a first probe is connected to sense the voltage at the primary winding of the ignition coil, a second probe is connected to sense the firing voltage of the number one spark plug, and a timing light having connected thereto a variable delay circuit is used to measure top dead center of the number one cylinder by means of a conventional strobing technique applied to the timing marks on the vehicle. Vehicle rpm is measured by starting and stopping a digital counter respectively on the consecutive leading edges of the voltage pulses from the primary winding of the ignition coil. Dwell is measured by starting the digital counter on the leading edge of the voltage pulse from the primary winding of the coil, and inverting the voltage pulse so that the counter is stopped on the next leading edge. The counter then contains a count which is the inverse of dwell at the vehicle rpm, and digital or analog means are used to convert the count to represent dwell. Timing is measured by adjusting the variable delay circuit connected to the timing light so that strobing of the timing light is retarded and occurs when the timing mark on the vehicle number one cylinder appears at the top dead center position. The digital counter is started by the leading edge of the voltage pulse which fires the number one cylinder, and the counter is stopped by the leading edge of the pulse from the delay circuit, the time between leading edges being a function of timing advance.

A high energy ignition adapter circuit and a signal conditioning circuit are connected to eliminate ringing and noise in the voltage pulse from the coil primary winding, and to provide a signal having leading and trailing edges which occur at the precise time that the ignition points open and close.

The timing light delay circuit is adapted to fire the timing light after a delay determined by the position of an adjustable potentiometer mounted on the timing light. By delaying the firing of the timing light for a time equal to the advance of the firing of the spark plugs relative to top dead center, the time between the firing of the spark plug and the generation of a pulse from the delay circuit is a measure of ignition timing. A feature of the timing light delay circuit is a provision for two delay ranges, selectable by the system operator as a function of vehicle speed.

In accordance with a further embodiment of the present invention, a display of the dwell measurement for each cylinder is produced, from which display malfunctions or wear in the distributor can be determined.

In accordance with a still further embodiment of the present invention, a digital counter is actuated to measure the time that the points are open, and the time that the points are closed, for each cylinder, and the average angular velocity due to the acceleration and deceleration cycle of each cylinder is computed in order to provide a measure of power contribution by each cylinder.

Other features and advantages of the present invention may be seen by reference to the accompanying specification and claims, read in conjunction with the drawings.

DESCRIPTION OF THE PREFERRED EMBODIMENTS

Figure 1:
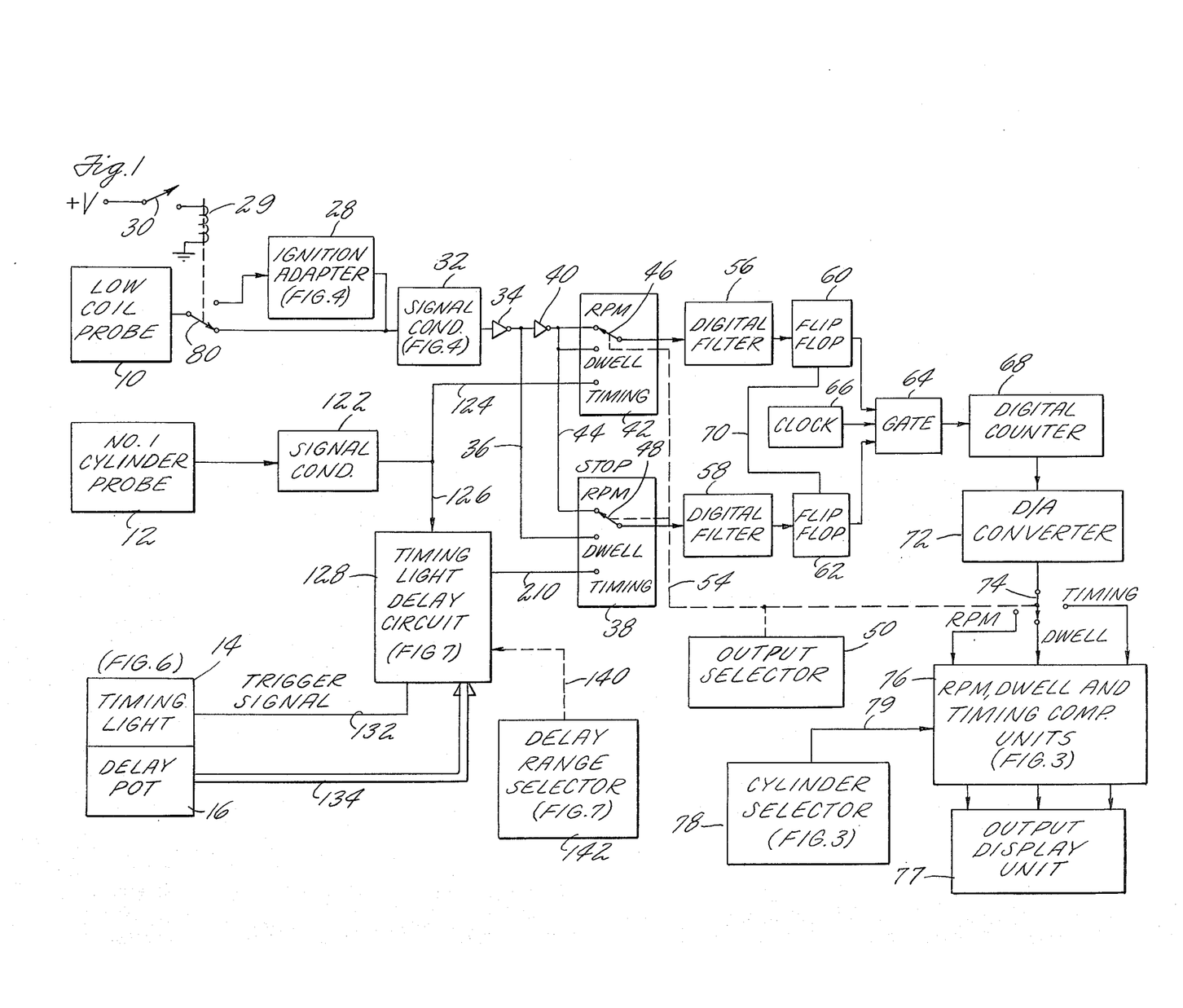
FIG. 1 is a schematic diagram of the engine rpm, dwell and timing system.

FIG. 1 shows in schematic block diagram form the basic system for computing engine rpm, dwell and timing. The system includes probe 10 connected to the primary winding of the ignition coil (low coil), a probe 12 connected to sense the high voltage fed to the spark plug in the engine number one cylinder, and a timing light 14 adapted to contain a variable delay potentiometer 16. Briefly, engine rpm and dwell are measured by actuating a digital counter in response to the pulses produced by the low coil probe 10. Timing is measured by enabling a digital counter to measure the time between the firing of the number one cylinder as measured by probe 12, and a delayed output signal from the timing 14, the delay being adjustable to be equivalent to timing advance. The count contained in the digital counter may be converted to rpm, dwell or timing by either analog or digital techniques.

Figure 2:
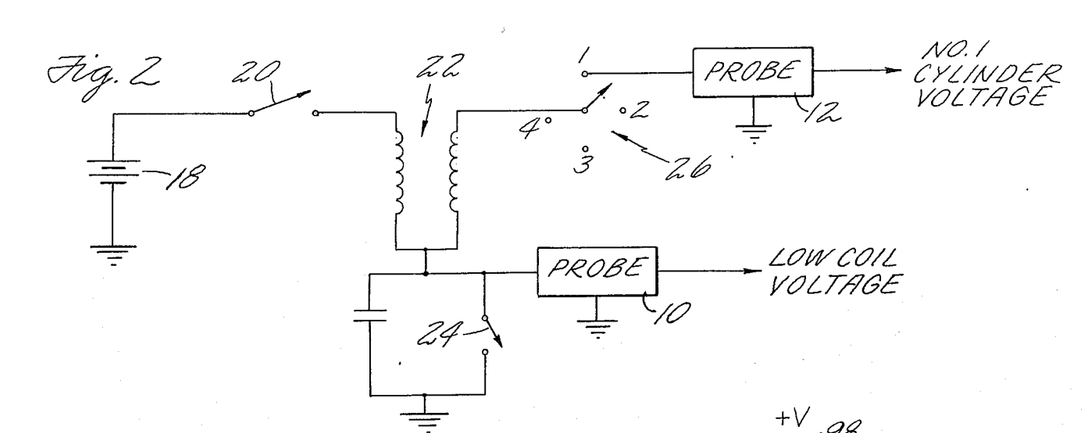
FIG. 2 is a schematic diagram of a typical engine ignition system showing the location of the probes of FIG. 1.

FIG. 2 shows schematically a typical ignition system for a vehicle having a four cylinder internal combustion engine. When the ignition switch 20 is closed, electrical current flows from the battery 18 into the primary winding of ignition coil 22 and through the closed distributor points 24 to store energy equal to ½ $LI^2$ in the primary winding of the coil 22. The secondary winding of the coil 22 is connected to the distributor shown generally at 26. When the points 24 open, the collapsing field in the primary circuit of coil 22 induces a high negative voltage in the secondary winding of the coil which is passed to the desired spark plug as a function of the rotation of the distributor 26. The structure and operation of an ignition system of this type is well known and need not be described in further detail. The low coil probe 10 of FIG. 1 is connected as shown in FIG. 2 across the ignition points 24, the probe 10 producing a voltage pulse which varies cyclically with each opening and closing of the points 24. Consequently, for a four cylinder engine as shown in FIG. 2, four cyclic low coil voltage pulses are produced for each rotation of the rotor of distributor 26. The voltage probe 12 is connected to sense the high energy voltage fed from the distributor to the number one cylinder spark plug, and for a four cylinder engine shown in FIG. 2 only one voltage pulse will be sensed by probe 12 for each rotation of the distributor rotor. While probe 12 may be connected to any of the spark plugs, it is most convenient to connect the probe to sense the voltage fed to the number one cylinder since most automotive vehicles having timing marks which are aligned with the top dead center position of the number one cylinder.

While the probe 12 is shown as an in-line probe, any convenient type of voltage probe including a clamshell type which clamps over the wire without breaking the connection may be used. The probe 10 is typically connected by means of alligator clips.

Engine rpm and dwell are both measured in response to the low coil voltage produced by probe 10. Passive signal conditioning circuitry, not shown, is typically connected with the low coil probe 10 to produce an output signal which varies between zero and five volts DC. The low coil voltage is then fed through a switch 80, the position of which is controlled in response to a relay 29 powered by a manually operable switch 30, either directly to a signal conditioner circuit 31, or through a high energy ignition adapter circuit 28 to the signal conditioner circuit 32, circuits 28 and 32 being described more particularly in conjunction with FIG. 4. During normal operation switch 30 remains open, and the low coil voltage feeds through switch 80 to signal conditioner circuit 32 as shown in FIG. 1. Briefly, the signal conditioner 32 eliminates the ringing which typically occurs upon the opening and closing of the points and produces a conditioned low coil signal with sharp leading and trailing edges. In FIG. 5, waveform A (solid lines) shows a typical output voltage produced by the low coil probe 10, and waveform D shows the output voltage produced by signal conditioner circuit 32.

Since the voltage output from the low coil probe 10, as conditioned by signal conditioner circuit 32, is in the form of a cyclic square wave pulse which increases in voltage each time the points open, and decreases in voltage each time the points close, if a counter is started on the leading edge of the pulse when the points open, and then is stopped on the next leading edge when the points again open, the count in the counter will be directly related to engine rpm. Likewise, since dwell is related to the time interval during which the points remain closed, if a counter is started when the points close, and is stopped when the points open, the count in the counter will be directly related to dwell. For reasons which will become evident hereinafter, it has been found advantageous when measuring dwell with the system of the present invention to start the counter when the points open, and stop the counter when the points close, the count in the counter then being inversely related to dwell and from which count dwell can be calculated by a simple arithmetic technique.

In order to accomplish the rpm and dwell measurement, the output from signal conditioning circuit 32, waveform D of FIG. 5, is fed through an inverter 34 (FIG. 1) where the waveform is inverted to the form shown by waveform E of FIG. 5. This voltage is fed via signal line 36 to the dwell input terminal of a multiplex switch 38. The voltage waveform E of FIG. 5 is also fed through an inverter 40 where it again assumes the form of waveform D of FIG. 5, and is fed to both the rpm and dwell input terminals of a multiplex switch 42, and also via line 44 to the rpm input terminal of multiplex switch 38.

The signals which pass through mutiplex switches 38 and 42 are controlled respectively by the position of adjustable switches 48 and 46 which are ganged together and simultaneously moved in response to a manually operated output selector 50 via lines 54. In other words, when it is desired to measure engine rpm, output selector 50 is actuated by the system operator to move switches 46 and 48 via line 54 to contact the rpm input terminals of multiplex switches 42 and 38 respectively. At this time only the signals appearing on the rpm input terminals pass through the multiplex switches. When it is desired to measure dwell, output selector 50 is actuated to cause switches 46 and 48 to move from the rpm input terminal to the dwell input terminal of multiplex switches 42 and 38, thereby permitting only the signals appearing on the dwell input terminals to pass through the multiplex switches. The signal passing through multiplex switch 42 is used to start a digital counter, and the signal passing through multiplex switch 38 is used to stop the digital counter. For accuracy and economy of circuit design, it has been found desirable to arrange the system so that starting and stopping of the counter for rpm, dwell and timing measurements occurs only on the leading edge of the voltage pulses which pass through multiplex switches 38 and 42.

Assuming that the switches 46 and 48 are connected to the rpm input terminals of multiplex switches 42 and 38, the voltage pulse shown at waveform D of FIG. 5 passes through multiplex switch 42 and into a digital filter 56. Likewise, the voltage pulse shown at waveform D of FIG. 5 also passes through multiplex swtich 38 to a digital filter 58. The digital filters 56 and 58 comprise electronic logic circuits which pass therethrough a change in an input signal only if the signal remains at its new level for a predetermined time, and will not pass therethrough changes in the input signal such as caused by noise which do not remain at the new level for the predetermined time. A digital filter circuit of the type shown by reference numerals 56 and 58 is disclosed in copending, commonly owned application Ser. No. 554,805 entitled "Digital Noise Discriminator" and filed on Mar. 3, 1975.

The output from digital filter 56 is fed to a flip flop 60, and the output from digital filter 58 is fed to a flip flop 62. The outputs from flip flops 60 and 62 are in turn fed to a gate 64 which is typically an AND gate. Also fed to gate 64 are clock pulses generated by a clock 66. Initially, gate 64 is closed so that no clock pulses pass therethrough. Flip flops 60 and 62 are conditioned such that the leading edge of the waveform D of FIG. 5, produced when the points, open, will change the state of flip flop 60 and open gate 64, thereby allowing clock pulses from clock 66 to pass through gate 64 into a digital counter 68 where the clock pulses are counted. Flip flop 62 is conditioned by the output state of flip flop 60 via line 70 to respond to the next leading edge of the waveform and close gate 64 so that clock pulses no longer pass therethrough. As a result, digital counter 68 will count the clock pulses which occur between one leading edge and the next leading edge of the waveform, the count in digital counter 68 being proportional to the time between consecutive leading edges of the waveform, i.e., the time between consecutive openings of the points. While not shown, flip flops 60 and 62 may be interconnected so that the flip flops are reset after each cycle and will respond again in the same manner to open and close the gate 64 on the next consecutive leading edges of the rpm waveform, thereby continually updating the count in digital counter 68. As described in conjunction with FIG. 10, other circuit arrangements may be used in which the desired measurement is made for each cylinder in turn.

The output count from the digital counter 68 is fed through a digital-to-analog converter 72 where there is produced an analog voltage equivalent to the count in digital counter 68. The analog output voltage from digital-to-analog converter 72 is fed through a three position switch 74 to one of three input terminals to the rpm, dwell and timing computation units 76. The details of the computation units 76 are shown specifically in conjunction with FIG. 3, and comprise computational circuitry for converting the output voltage from converter 72 into an rpm, dwell or timing measurement signal depending upon the position of switch 74. The position of switch 74 is controlled by the output selector 50 in conjunction with switches 46 and 48 in the multiplex switches 42 and 38 respectively, that is, when output selector 50 is actuated to select the rpm computation, switches 46, 48 and 74 are simultaneously moved to the rpm terminals, and at this time only the rpm computation will be performed by computation units 76. The output from computation units 76 will be a signal proportional to rpm, dwell or timing which may be fed to an indicator or other output display device 77.

Also shown feeding into the rpm, dwell and timing computation units 76 via line 79 is a signal from a cylinder selector 78. The cylinder selector 78 may be controlled manually by the operator of the system to produce a signal indicative of the number of cylinders in the engine of the vehicle under test, typically 4, 6 or 8 cylinders. As will be described in conjunction with FIG. 3, the computation of rpm, dwell and timing is a function of the number of cylinders, and information as to the numbers of cylinders in the engine under test is required by the computation units 76.

The dwell computation is also performed with the output from the low coil probe 10 of FIG. 1. When it is desired to measure dwell, output selector 50 is actuated to cause switches 46, 48 and 74 to make contact with the respective dwell terminals. The waveforms D of FIG. 5 is fed to the dwell input of multiplex switch 42, and the leading edge of the waveform causes flip flop 60 to transition and open 64, allowing clock pulses from clock 66 to pass to digital counter 68. The waveform E of FIG. 5 is fed to the dwell input of multiplex switch 38 via line 36, waveform E being inverted with respect to waveform D of FIG. 5. As a result, flip flop 62 will be actuated and cause gate 64 to close upon the closing of the points, that is, on the leading edge of waveform E, FIG. 5. Digital counter 68 will therefore contain a count proportional to the time between the opening and closing of the points. As will subsequently be described, a delay $\tau$ occurs between the closing of the points and the leading edge of waveform E, FIG. 5, the delay $\tau$ being caused by the operation of signal conditioner 32. The delay is compensated in the computation unit 76 as explained hereinafter.

The count in digital counter 68, which is equivalent to the number of clock pulses between the opening and closing of the points, is the inverse of dwell, since dwell is related to the time that the points are closed. However, in the rpm computation the time between consecutive openings of the points is known, and dwell is computed in block 76 by a simple arithmetic process using the previous rpm measurement.

Figure 4:
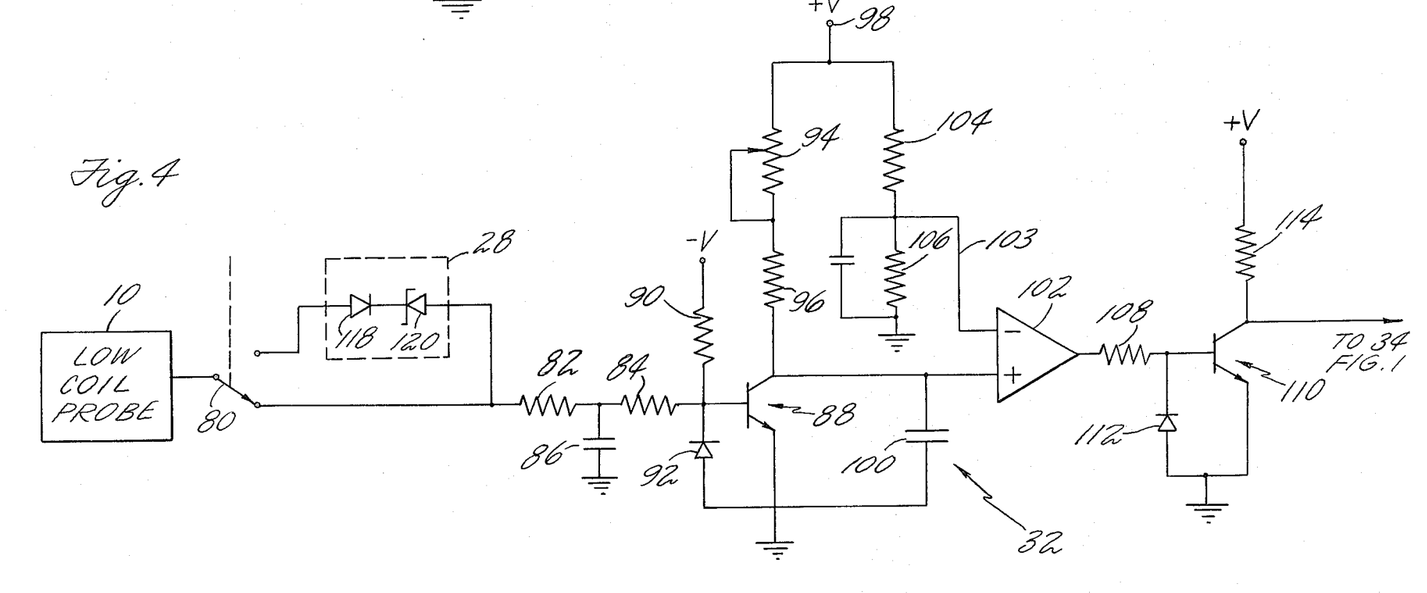
FIG. 4 is a schematic circuit diagram of the high energy ignition adapter and low coil signal conditioner of FIG. 1.
Figure 5:
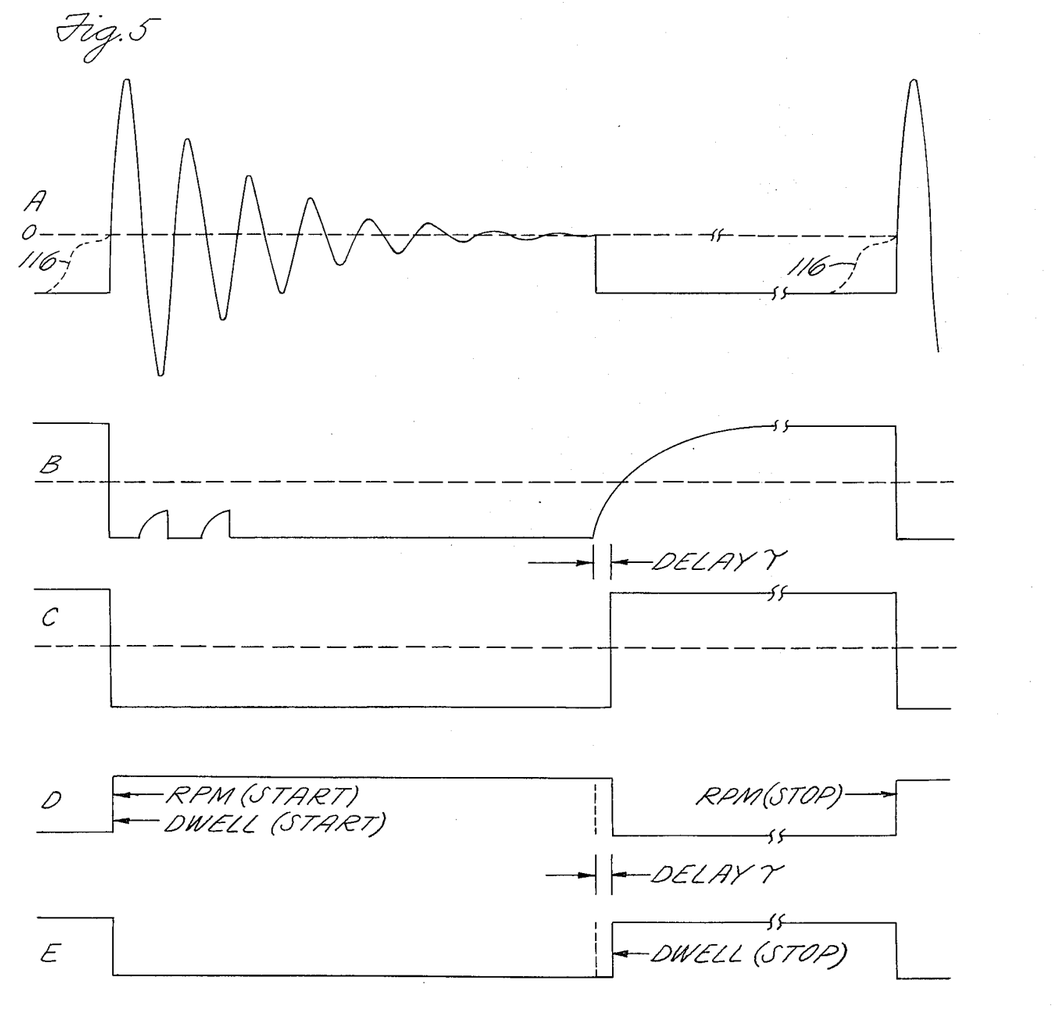
FIG. 5 shows the waveform produced by the circuit of FIG. 4.

FIG. 4 shows the details of the high energy ignition adapter circuit 28 and the signal conditioner circuit 32. The ringing negative and positive going high voltage unconditioned low coil signal produced by probe 10 is shown at waveform A of FIG. 5. The waveform normally produced from the low coil probe 10 is shown by the solid lines in waveform A, and switch 80 will be in its normal position so that the voltage waveform bypasses the high energy ignition adapter circuit 28. The voltage waveform is fed through series resistors 82 and 84 and parallel filtering capacitor 86 to the base junction of a transistor 88, the transistor 88 having a grounded emitter and a negative supply voltage provided to the base thereof through a resistor 90. A diode 92 is connected between the emitter and base of transistor 88 to maintain the base junction of transistor 88 at a voltage slightly more negative than ground and prevent conduction of transistor 88 until the occurrence of the leading edge of the low coil voltage waveform.

Since the rpm and dwell measurements are made as described in conjunction with FIG. 1 by enabling a clock gate to a digital counter on one leading edge of the conditioned low coil signal, and stopping the clock gate on the next leading edge of the conditioned low coil waveform, it is important that the ringing of the low coil waveform shown by waveform A of FIG. 5 should cause no false edges, that is, it is desirable that the leading and trailing edges of the conditioned low coil waveform be as sharp as possible. This requirement is achieved by means of a delay circuit comprising resistors 94 and 96 connected to the collector of transistor 88 and through which a positive voltage is supplied from terminal 98, and by connecting a capacitor 100 between the collector of transistor 88 and ground. On each negative excursion of the low coil voltage waveform, the capacitor 100 is charged since transistor 88 is not conducting at this time and the capacitor 100 is connected directly in series between the voltage source 98, resistors 94 and 96, and ground. On positive excursions of the low coil waveform signal, the charge on capacitor 100 is discharged since transistor 88 now saturates, driving the collector voltage essentially to ground potential. The alternate charging and discharging of the capacitor 100 is represented by waveform B of FIG. 5. The time constant of the RC network comprising resistors 94 and 96 and capacitor 100 is selected such that for the maximum length of a false negative going signal on the low coil waveform, the trip level of a comparator 102 connected to the capacitor 100 is not reached. By referring to waveform B of FIG. 5, it may be noted that during the ringing portion of the low coil signal, the negative and zero excursions are not long enough to charge capacitor 100 sufficiently to trip the comparator 102. However, after the ringing of the low coil waveform has stopped, the next negative going edge of the waveform A, which occurs upon closing of the points, allows sufficient time for the capacitor 100 to charge up and trip the comparator 102. The negative input of comparator 102 is supplied via line 103 from voltage source 98 and voltage dividing resistors 104 and 106.

When the capacitor 100 charges sufficiently positive for comparator 102 to be tripped, that is, when the points close, the comparator 102 changes states. The output from the comparator 102 is shown by voltage waveform C of FIG. 5. If resistors 104 and 106 are equal, the delay $\tau$ between the negative going edge of the voltage waveform A and the tripping of the comparator shown by waveform C is solely determined by the accuracy of resistors 94 and 96 and capacitor 100. This fact results by virtue of the fact that the voltage source 98 is used both as the reference to the comparator 102 and also to charge up capacitor 110, and therefore does not affect the delay accuracy. Since the delay $\tau$ is known and fixed independent of rpm, it may be corrected by subtracting a constant equal to the delay $\tau$ in the dwell computation as will be described in conjunction with FIG. 3.

The delay $\tau$ produced by the signal conditioner circuit 32 does not affect the rpm computation since the digital counter 68 of FIG. 1 is both started and stopped upon the opening of the breaker points, the delay $\tau$ only affecting the waveform generated upon closing of the breaker points and used in the dwell computations.

Referring back to FIG. 4, the output from comparator 102 is fed through a resistor 108 into the base of a transistor 110. The emitter of transistor 110 is grounded and connected to the base junction via diode 112, and a positive voltage is fed to the collector of transistor 110 through resistor 114. The output from transistor 110 is the waveform D of FIG. 5 which is fed via inverters 34 and 40 to the start and stop multiplex switches 42 and 38 of FIG. 1.

The waveform produced by the low coil of most present-day automobile ignition systems is shown by the solid line in waveform A of FIG. 5. However, in some engine ignition systems, particularly those manufactured by General Motors Corporation, a high energy ignition system is used which produces a waveform shown by the dotted line 116 of waveform A, FIG. 5. It has been found that this type of waveform often causes an erroneous output signal, that is, the portion of the waveform shown by dotted line 116 causes early switching of the comparator 102 and produces a false leading edge signal. This results in erroneous rpm and dwell readings. To overcome this problem, a bypass circuit comprising a series diode 118 and a reverse biased Zener diode 120 are placed in series with switch 80 in the high energy ignition adapter circuit 28. When tests are being performed on vehicles which incorporate high energy ignition systems, switch 30 (FIG. 1) is closed, thereby moving switch 80 to the terminal connected with the ignition adapter circuit 28 and providing a path for the low coil signal from probe 10 to the signal conditioner 32 through the diode 118 and Zener diode 120. The low coil waveform will not pass through the high energy ignition adapter circuit 28 until the voltage has reached an amplitude sufficent to overcome the breakdown voltage of the Zener diode 120, thereby eliminating the possibility of early actuation of the comparator 102 of signal conditioner 32 which would produce a false leading edge to the low coil waveform.

Referring again to FIG. 1, the ignition timing is measured by starting the digital counter 68 on the leading edge of the signal produced by the number one cylinder probe 12, and stopping the counter on the leading edge of an output signal from a timing light delay circuit 128. Briefly, the signal from the number one cylinder probe 12 is fed through a signal conditioning circuit 122 which contains circuitry of the type which will modify the raw signal from the number one cylinder probe 12, as shown at waveform F of FIG. 8, and produce therefrom a conditioned number one signal in the form of a pulse having sharp leading and trailing edges as shown by waveform H of FIG. 8. Also shown in FIG. 8 at waveform G are the conditioned low coil pulses from a four cylinder engine to illustrate the timing of the number one cylinder signal with respect to the low coil signals. The conditioned number one signal is fed via line 124 to the timing input terminal of the start multiplex switch 42. The conditioned number one waveform signal is also fed via line 126 to the timing light delay circuit 128.

Figure 6:
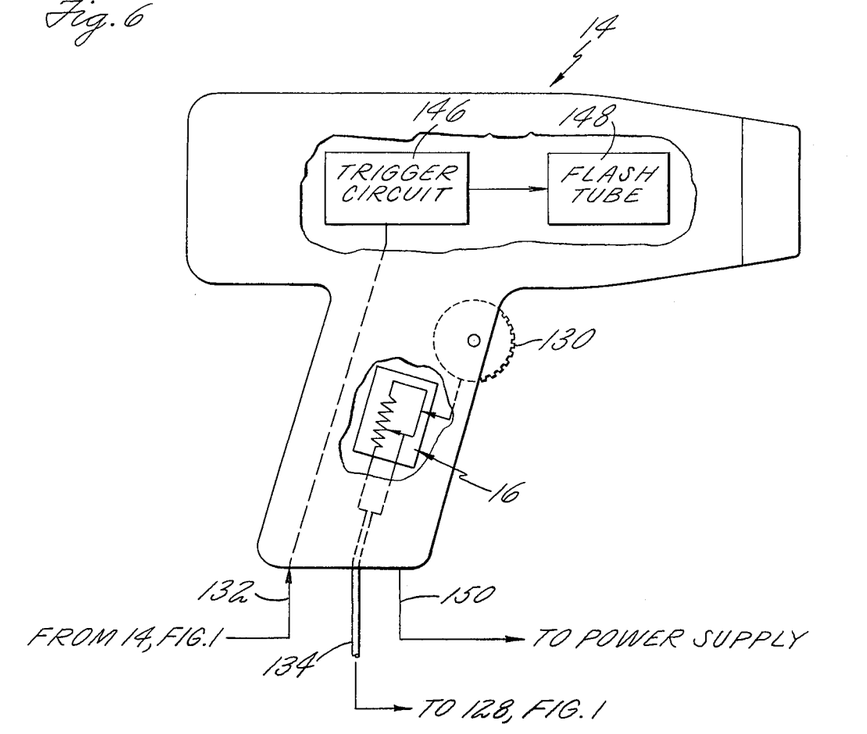
FIG. 6 is a diagram of a timing light used in conjunction with FIG. 1.

The timing light delay circuit 128 produces a square wave output pulse having a leading edge which is delayed in time from the leading edge of the conditioned number one pulse by an amount determined by the position of a delay potentiometer 16 connected with timing light 14. The timing light 14, shown schematically in FIG. 6, is a standard commerical timing light slightly modified to contain a delay potentiometer 16 and used in the conventional manner to determine when the number one cylinder piston is at its top dead center position as indicated by the timing marks on the damper and engine block of motor vehicle engines. In general, when the timing mark on the damper is aligned with the timing mark on the engine block, the number one cylinder piston is at its top dead center position. However, with present-day engines it is standard practice to advance the voltage pulse to the spark plugs so that ignition occurs a number of degrees before the piston attains its top dead center position in order to increase engine efficiency and decrease pollution. This timing advance is specified by the manufacturer of the vehicle, and is generally a function of engine rpm. In order to measure the timing advance, the delay potentiometer 16 is connected within the timing light as shown in FIG. 6, and is adjustable such as by a thumbwheel 130. The delay potentiometer 16 is then connected to the timing light delay circuit 128 by lines 134 and will retard the triggering signal to the timing light 14 by a time determined by the resistance of the delay potentiometer 16. The operator will adjust the potentiometer 16 by means of the thumbscrew 130 so that the timing light fires or strobes when the timing marks are exactly aligned. The timing light delay circuit will produce its output pulse as a function of the delay time, which is determined by the resistance of potentiometer 16. By starting the digital counter 68 upon the firing of the number one cylinder as determined by the pulse from probe 12, and by stopping the digital counter on the leading edge of the delayed pulse from the timing light delay circuit 128 fed to multiplex switch 38 via line 210 (FIG. 1), the count in the digital counter will be equivalent to the delay time produced in the timing light delay circuit 128, which is in turn equivalent to the timing advance.

Referring to FIG. 1, the trigger signal is fed via line 132 from the timing light delay circuit 128 to the timing light 14 to actuate the timing light 14 in accordance with the delay provided by the delay circuit 128. As will be described in detail in conjunction with FIG. 7, the timing light delay circuit 128 will provide a delay in the output signal therefrom which is adjustable by potentiometer 16 within one of two selectable delay ranges, a range $\tau_1$ and a range $\tau_2$, the range being selectable such as by a delay range selector 142 (FIG. 1) via line 140.

The timing light in FIG. 6 is a conventional timing light which has been slightly modified to incorporate the timing light delay potentiometer 16 which is controlled by the adjustable thumbwheel 130. The timing light 14 contains a trigger circuit 146 which causes actuation of a flash tube 148 at the proper time as determined by the trigger signal on line 132 which is fed to the trigger circuit 146 from the timing light delay circuit 128 (FIG. 1). The delay potentiometer 16 is connected to the timing light delay circuit 128 of FIG. 1 via line 134. Power is supplied to the timing light 14 in a conventional manner via line 150.

Figure 7:
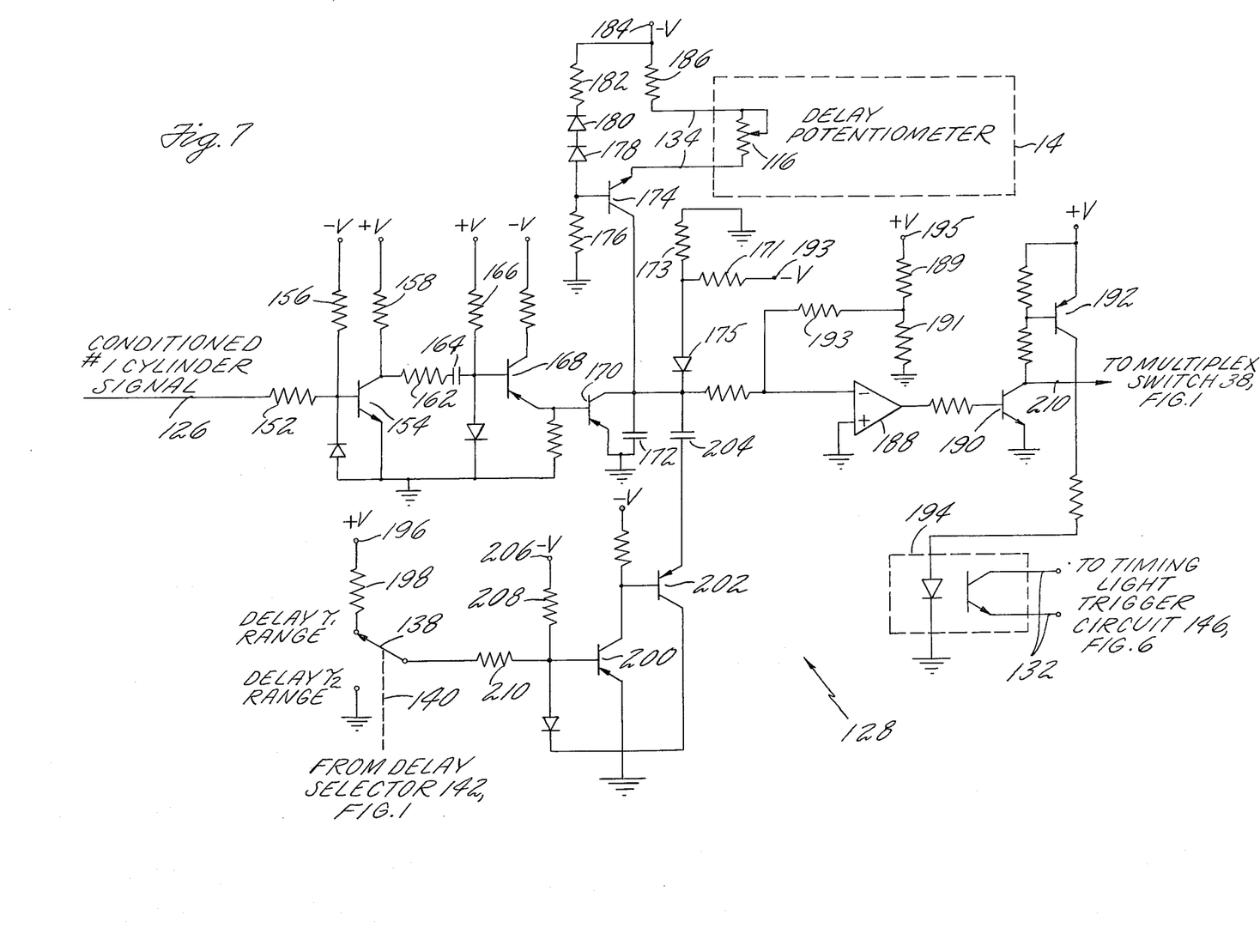
FIG. 7 is a schematic circuit diagram of the timing light delay circuit of FIG. 1.
Figure 8:
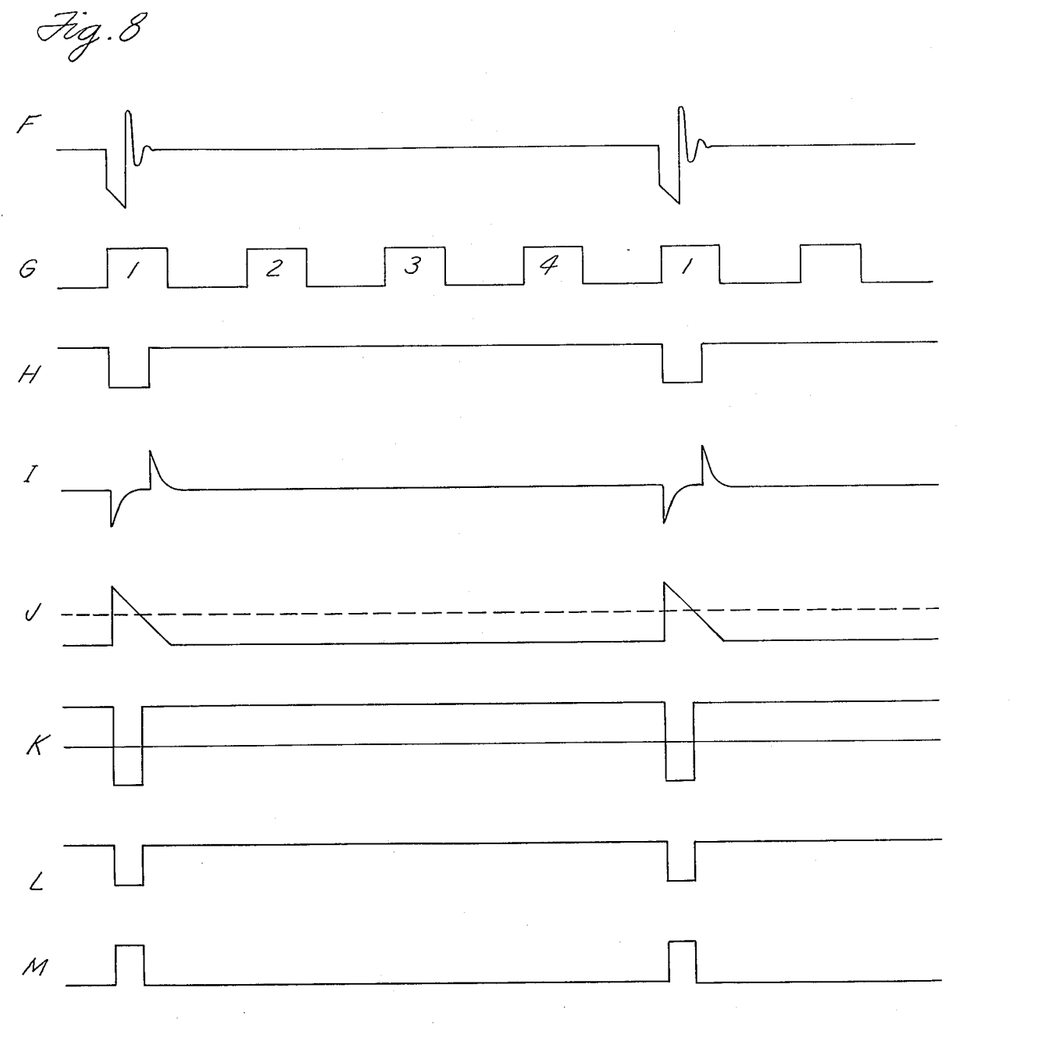
FIG. 8 shows the waveforms produced by the circuit of FIG. 7.

The details of the timing light delay circuit 128 with the selectable delay ranges $\tau_1$ and $\tau_2$ are shown in FIG. 7. The conditioned number one cylinder signal on line 126, FIG. 1, as shown at waveform H of FIG. 8, is fed through resistor 152 to the base junction of transistor 154. Transistor 154 is normally nonconducting by virtue of the negative voltage supplied to the base junction thereof through resistor 156. A positive voltage is supplied to the collector of transistor 154 through resistor 158, and a diode 160 is connected between the emitter and base of transistor 154.

The conditioned number one signal on line 126 is differentiated by means of resistor 158, a series resistor 162 and capacitor 164, a resistor 166 connected to a positive source of voltage, and transistor 154, to produce at the base junction of a transistor 168 the waveform shown at I, FIG. 8. On the negative going portion of the differentiated signal, transistor 168 is turned on, supply base current to a transistor 170 and driving transistor 170 into saturation. A capacitor 172 is connected across transistor 170, and any charge on the capacitor is discharged through the conducting transistor 170 after passage of the negative going differentiated pulse. After passage of the number one pulse, transistors 168 and 170 turn off, causing capacitor 172 to charge in a linear fashion. The charging current to capacitor 172 is provided by a variable current source consisting of transistor 174, resistor 176, diodes 178 and 180, resistor 182, voltage source 184, resistor 186 and the delay potentiometer 16 which is physically positioned within timing light 14 and connected to the timing light delay circuit via lines 134. A fixed negative voltage is applied to the base of transistor 174 as a result of the voltage drop across fixed resistors 176 and 182 between ground and negative voltage source 184. Hence transistor 174 is continuously conducting. However, the current through transistor 174 is determined by the variable resistance in its emitter circuit comprising delay potentiometer 16 and fixed resistor 186. As a result, the current through transistor 174 and therefore the charging rate of capacitor 172 will be determined by the resistance of delay potentiometer 16 which is in turn a variable. When transistors 168 and 170 are turned off, capacitor 172 charges in a linear fashion until the reference voltage to a comparator 188, produced by resistors 189, 191 and 193, and positive voltage source 195, is exceeded. Once the reference voltage to the comparator 188 is exceeded, the comparator 188 switches from a negative clamp to a positive clamp. A negative voltage source 193 supplies a negative bias to a diode 175 via resistor divider 171, 173 to clamp the output across capacitor 172 to a negative value, thereby reducing the discharge time of capacitor 172. While not shown, feed forward compensation may be employed with the operational amplifier circuit of comparator 188 to achieve minimum delay in switching the comparator.

When the output from comparator 188 has become positive, transistors 190 and 192 are turned on, conduction of transistor 192 turning on an optical coupler 194. The output of the optical coupler 194 is connected to the trigger circuit 146 in timing light 14 via lines 132 which preferably are a twisted pair shielded cable to minimize noise pickup. The optical coupler output may be differentiated and used to trigger and SCR circuit, not shown, located in the timing light 14 to cause the light to flash after a delay time determined with respect to the firing of the number one cylinder by virtue of the setting of delay potentiometer 16.

FIG. 8 shows the waveforms in connection with the operation of the circuit of FIG. 7. Waveform J shows the change in the voltage across capacitor 172 as a function of the differentiated number one cylinder signal shown at waveform I. Waveform K shows the output from comparator 188, waveform L shows the output from optical coupler 194 which triggers the timing light via lines 132, and waveform M shows the output from transistor 190 which is fed to multiplex switch 38 via line 210.

The operation of the circuit of FIG. 7 as described assumes that delay selector 142 of FIG. 1 has been adjusted so that delay range $\tau_1$ is selected. In FIG. 7, this is shown by connecting switch 138 to a positive voltage source 196 through a resistor 198. The positive voltage source 196 provides a positive voltage at the base junction of transistor 200. Transistors 200 and 202 are nonconductive, and a capacitor 204, which is connected in series with transistor 202, is essentially removed from the circuit. In order to increase the delay time of the circuit such as during cranking or low speed operation, delay selector 142 is actuated to move switch 138 to select delay range $\tau_2$. By grounding switch 138, a negative voltage is applied to the base of transistor 200 as a result of the voltage drop from negative voltage source 206 through resistors 208 and 210. Transistor 200 now becomes conductive, turning on transistor 202 and driving it into saturation. Saturating transistor 202 effectively grounds one side of capacitor 204 connecting it in parallel with capacitor 172 and thereby increasing the time necessary for a given output current from the current source (transistor 174) to charge up capacitors 172 and 204 to exceed the reference voltage to comparator 188.

The delay circuit 128 of FIG. 7 is connected by fairly long cables 134 to the delay potentiometer 16 in the external timing light 14, and has been found to be insensitive to noise pickup on the cable leads, and capable of being adjusted in a linear manner by means of the single potentiometer 16 over a delay ratio of approximately 1000 to 1. The ability to provide two delay ranges by connecting capacitor 204 in parallel with capacitor 172 permits the circuit to be used at low rpm where the actual time between the firing of the spark plugs is relatively long. The delay provided by the circuit decreases with increases in current through the transistor 174, the current being a direct function of the resistance of delay potentiometer 16. Up to 60 degrees advance can be measured with the circuit of FIG. 7 with a commercially available timing light modified as disclosed herein. It should be noted that the count in the digital counter 68 of FIG. 1 is a measure of the delay in time provided by timing light delay circuit 128, not the number of degrees of advance.

Figure 3:
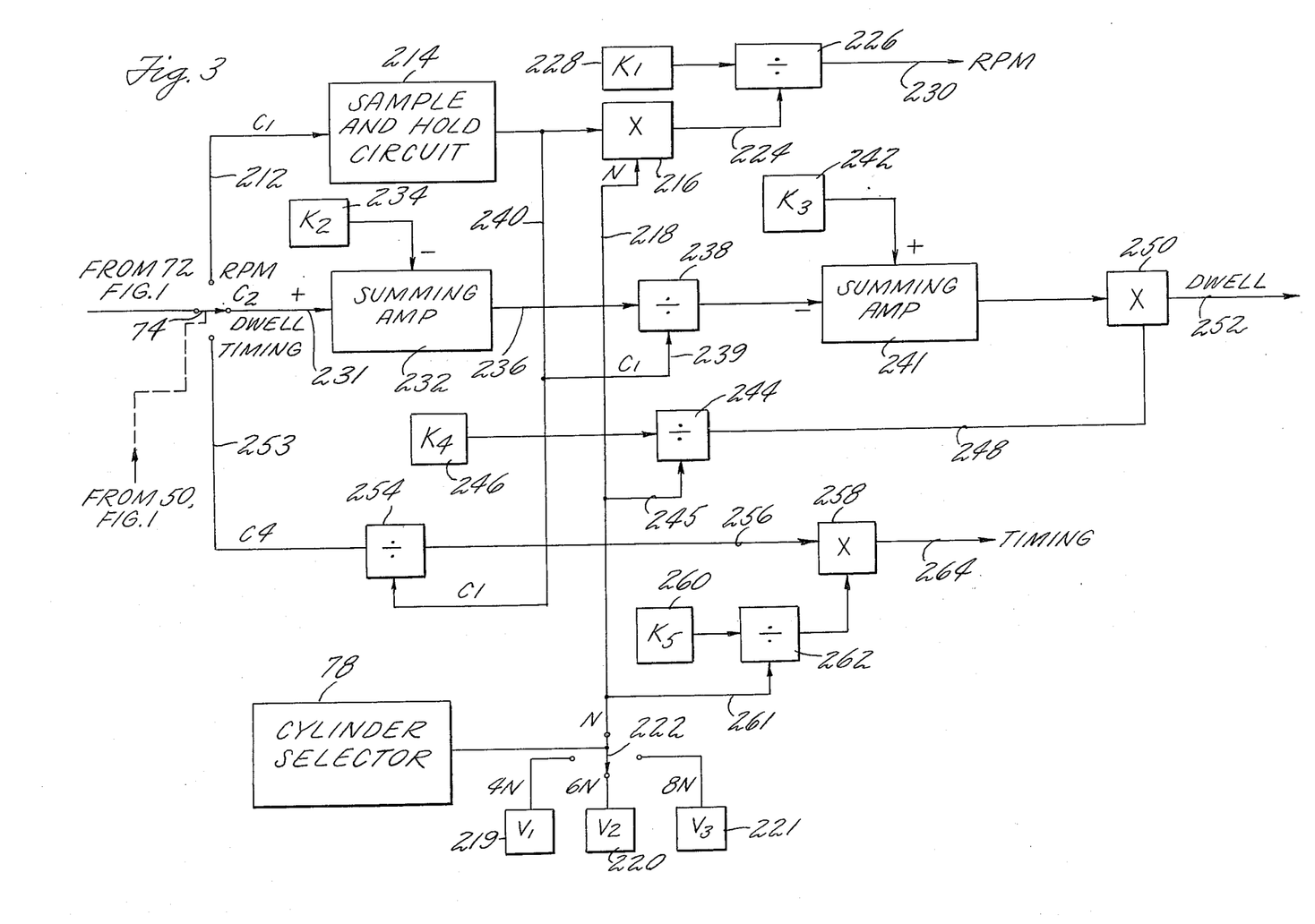
FIG. 3 is a schematic diagram of the analog rpm, dwell and timing computation units of FIG. 1.

The details of the rpm, dwell and timing computation units shown as block 76 in FIG. 1 are shown in FIG. 3. The count in the digital counter 68, which has been converted to an analog signal in digital-to-analog converter 72, is fed through switch 74 to either the rpm, dwell or timing computation terminal as a function of the position of output selector 50.

The rpm computation is performed in accordance with the following equation:

$$RPM = \frac{2.4 \times 10^6}{N \times C_1}, \qquad \text{Equation (1)}$$

where the numerator is a function of the construction of digital counter 68, N is the number of cylinders, and $C_1$ is the contents of the counter 68 when rpm is being computed.

Assuming that output selector 50 has selected rpm, and switches 46, 48 and 74 are in contact with the rpm terminals, an analog signal indicative of the count $C_1$ in the digital counter 68 is fed via signal line 212 to the sample and hold circuit 214 where the quantity $C_1$ is stored. The sample and hold circuit 214 is required since the quantity $C_1$ is also used in the dwell and timing computations.

Cylinder selector 78, also shown in FIG. 1, is connected to a switch 222 which selects a voltage $V_1$, $V_2$ or $V_3$ shown in blocks 219, 220 and 221, and which are respectively proportional to 4N, 6N and 8N where N is the number of cylinders in the vehicle engine under test. The selected signal N is fed from switch 222 via line 218 to a multiplier 216 where the quantity N times $C_1$ is computed. The output from the multiplier 216 is fed via line 224 to a divider 226 to which has also been fed a constant voltage $K_1$ shown in block 228, the constant $K_1$ being equivalent to the numerator of Equation (1). The output from the divider 226 on line 230 is a voltage proportional to rpm. The output may then be fed to an indicator or other output device as shown by output display unit 77 of FIG. 1.

Dwell is computed according to Equation (2) as follows:

$$\text{DWELL} = \frac{360°}{N}\left[1 - \left(\frac{C_2 - K_2}{C_1}\right)\right] \quad \text{Equation (2)}$$

For computation of the dwell signal, assuming that switches 46, 48 and 74 are connected to the dwell terminals, the digital counter 68 of FIG. 1 will contain a count $C_2$ which is fed through the digital-to-analog converter 72 and through switch 74 via line 231 to a summing amplifier 232. Also fed to summing amplifier 232 is a constant $K_2$ shown in block 234 which is equal to $\tau$, the delay in the low coil signal produced by capacitor 100 of the signal conditioning circuit 32 shown in FIG. 4, and also illustrated at waveforms D and E of FIG. 5. The delay $\tau$ must be subtracted so that the output from the summing amplifier 232 is proportional to the time between the actual opening and closing of the points. The output from summing amplifier 232 is fed via line 236 to a divider 238 where it is divided by the contents of the sample and hold circuit, $C_1$, which appears on lines 240 and 239. Since dwell is a distributor angle, and since the system disclosed in FIG. 1 measures time, the rpm of the engine must be taken into account in order to compute dwell.

The output from divider 238 is fed into a summing amplifier 241 where it is subtracted from a constant $K_3$ shown at block 242, the constant $K_3$ being equal to 1. The term in the dwell equation 360°/N is computed in divider 244 which receives inputs of a constant $K_4$ from block 246, and the number of cylinders N via line 245. The output from divider 244 is then fed to a multiplier 250 via line 248 where it is multiplied by the output from summing amplifier 241, the output from multiplier 250 on line 252 being the dwell signal.

Timing is computed according to the following Equation (3):

$$\text{TIMING} = \frac{720°}{N} \times \frac{C_4}{C_1} \quad \text{Equation (3)}$$

Again assuming that the switches 46, 48 and 74 have been set by output selector 50 to the timing terminals, the digital counter 68 will contain a count $C_4$ which is proportional to the difference between the time of the leading edge of the number one cylinder signal, and the leading edge of the signal from the timing light delay circuit 128. The count in digital counter 68 is fed through digital-to-analog converter 72 of FIG. 1, and the analog voltage is fed through switch 74 via line 253 to divider 254 where the quantity $C_4$ is divided by the quantity $C_1$ from the sample and hold circuit 214 and which appears on line 240. The output from divider 254 is fed via line 256 to a multiplier 258. Also fed to multiplier 258 is the output from divider 262 equivalent to the constant $K_5$ in block 260 divided by N, the number of cylinders, from line 261. The output from the multiplier 258 on line 264 is a voltage proportional to degrees of advance.

Figure 9:
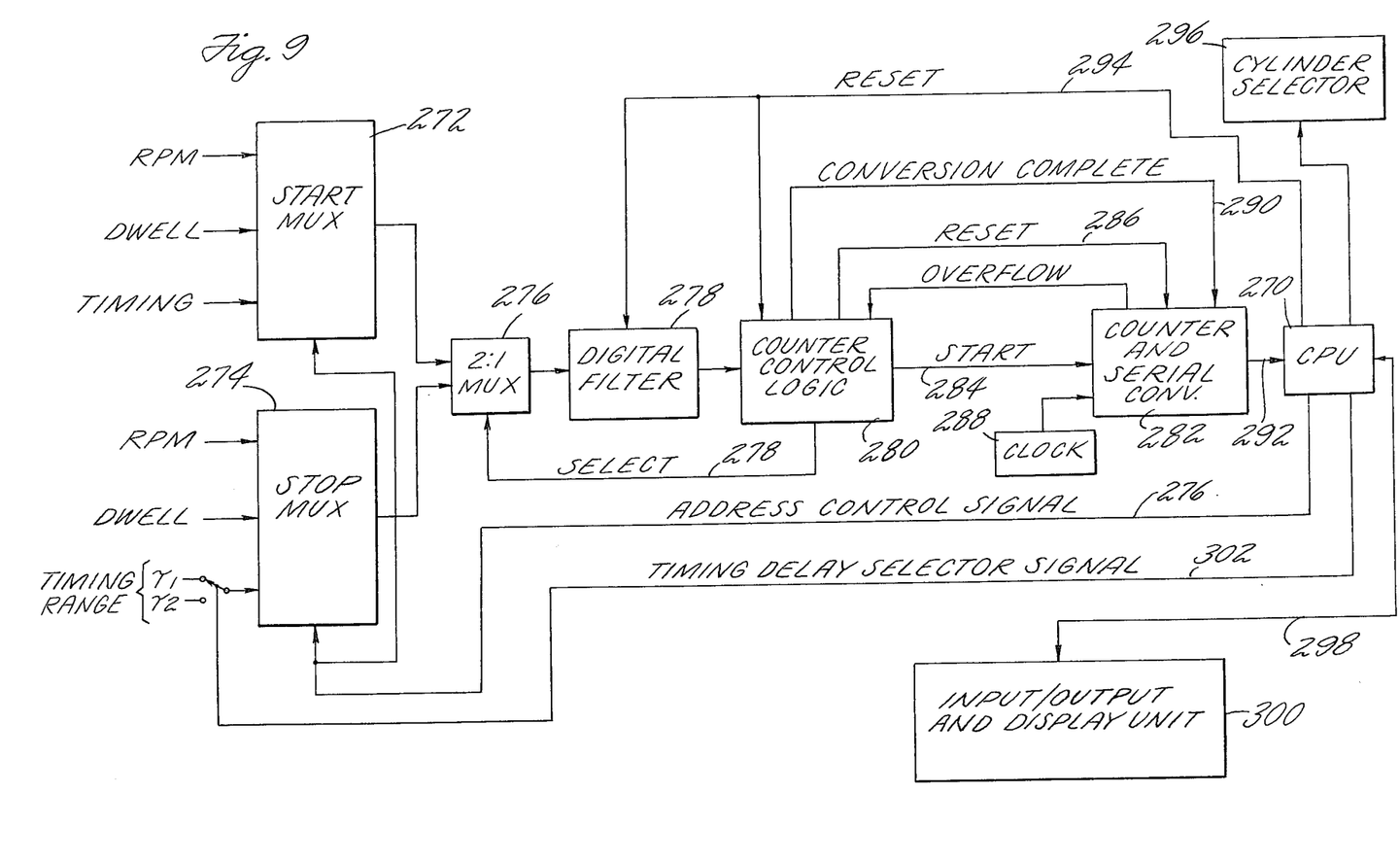
FIG. 9 is a schematic diagram of a digital implementation of the engine rpm, timing and dwell system.

FIG. 9 shows a digital implementation of the rpm, timing and dwell computation system. The computations are performed in a digital manner in a central processing unit 270 which may be a general purpose digital computer programmed in accordance with procedures well known in the art. Equations (1), (2) and (3) can be implemented in the central processing unit 270.

Referring to FIG. 9, the rpm, dwell and timing signals derived as shown in FIG. 1 are fed to a start multiplex circuit 272, and a stop multiplex circuit 274, the mutliplex circuits being digital equivalents of the start and stop multiplex switches 42 and 38 of FIG. 1. An address control signal on signal line 276 is fed from the central processing unit 270 to address the start and stop multiplex circuits 272 and 274 and control the passage therethrough of either the rpm, dwell or timing signals as a function of the program stored in the central processing unit 270. The selected signals pass through the multiplex circuits to a two to one multiplex circuit 276, and the desired signal selected by a line 278 from a counter control logic circuit 280 passes through multiplex circuit 276 and a digital filter 278 to the counter control logic circuit 280. The counter control logic circuit 280 contains well-known digital logic circuitry which controls the starting and stopping of the counter and serial converter 282 via start line 284 and reset line 286. A series of clock pulses from clock 288 is fed into the counter and serial converter 282. Also shown connecting counter control logic circuit 280 with the counter and serial converter 282 is a line 290 which indicates to the counter 282 when conversion of the data is complete.

The output from the counter and serial converter 282 is fed to the central processing unit 270 via line 292. A reset signal is fed from the central processing unit 270 via line 294 to the counter control logic circuit 280 and to the digital filter 278. A cylinder selector 296 feeds information to the central processing unit 270 as to the number of cylinders in the engine under test. The output from the central processing unit 270 is fed via line 298 to an input/output and display unit 300 which may be a printer, a hand held controller or other well-known device. The cylinder selection may be incorporated in the unit 300. The central processing unit 270 also feeds a signal via line 302 to select the timing range, $\tau_1$ or $\tau_2$, as a function of rpm. The computations of rpm, dwell and timing shown in Equations (1), (2) and (3) are performed by the central processing unit 270 by virtue of a stored program in a manner well known to those skilled in the art.

Whether the computations are performed in an analog or a digital manner, the present system has the inherent capability of providing data as to vehicle engine and/or ignition system performance beyond the measurement of rpm, dwell and timing. For example, a common problem with ignition systems is the mechanical wear associated with the distributor shaft bearings and drive gears. These problems manifest themselves as variations in dwell angle readings from cylinder to cylinder which cannot be detected in prior art analog systems which are averaging systems. By measuring dwell on a cylinder to cylinder basis, distributor problems can readily be detected.

The present system automatically identifies the dwell measurement and the particular engine cylinder producing the measurement by virtue of the number one cylinder signal produced by probe 12. For example, with the digital embodiment of FIG. 9, the signal produced by the number one cylinder is fed to the start multiplexer 272, and uniquely identifies the information fed to the central processing unit 270 at that time as being produced by the number one cylinder. Since the central processing unit 270 is also fed data indicative of the number of cylinders in the vehicle under test cylinder selector 296, the data produced by each cylinder is uniquely identified. In the system of FIG. 9, the conversion complete signal on signal line 290 identifies to the central processing unit 270 the occurrence of a number one cylinder signal. The program instructions for causing the dwell angle data computed in central processing unit 270 to be displayed on an output display unit 300, which may include an oscilloscope, and to be identified as to each cylinder, are well known to those skilled in the art. The display of dwell angle for each cylinder provides the system operator with a unique means for identifying mechanical or other malfunctions in the vehicle distributor, and variations in dwell angle between cylinders inherently identify distributor problems. As an example, the distributor points for a four cycle engine are driven from the engine crankshaft at one-half crankshaft speed, normally via an intermediate drive such as the camshaft. For two stroke spark ignition engines, the speed relationship is one to one albeit design considerations in most cases force the location of the distributor at some other intermediate position. As the gear mesh wears or as the bearing gear mesh in the distributor wears, the dwell will vary. Radial play caused by worn distributor bearings will cause a radial motion of the distributor and breaker point lobes. This motion will cause the points and consequently the dwell period to change. Likewise a worn timing chain or distributor drive gear will result in angular changes in distributor drive shaft velocity, causing an erratic reading in dwell. Since the system computes individual dwell readings these characteristics may be observed.

By means of a slight modification to the system, the power contribution and dynamic relative compression of each cylinder may be determined. In prior art power contribution schemes, it has been customary to measure the power contributed to the vehicle by each cylinder by defeating the spark to each of the cylinders in turn, and measuring the resultant decrease in rpm. A significant decrease in rpm is indicative of a properly operating cylinder, while a small or zero decrease in rpm when a cylinder is defeated indicates that the defeated cylinder is contributing little or nothing to vehicle power. With this information proper diagnosis and repairs can be made to the engine.

Figure 11:
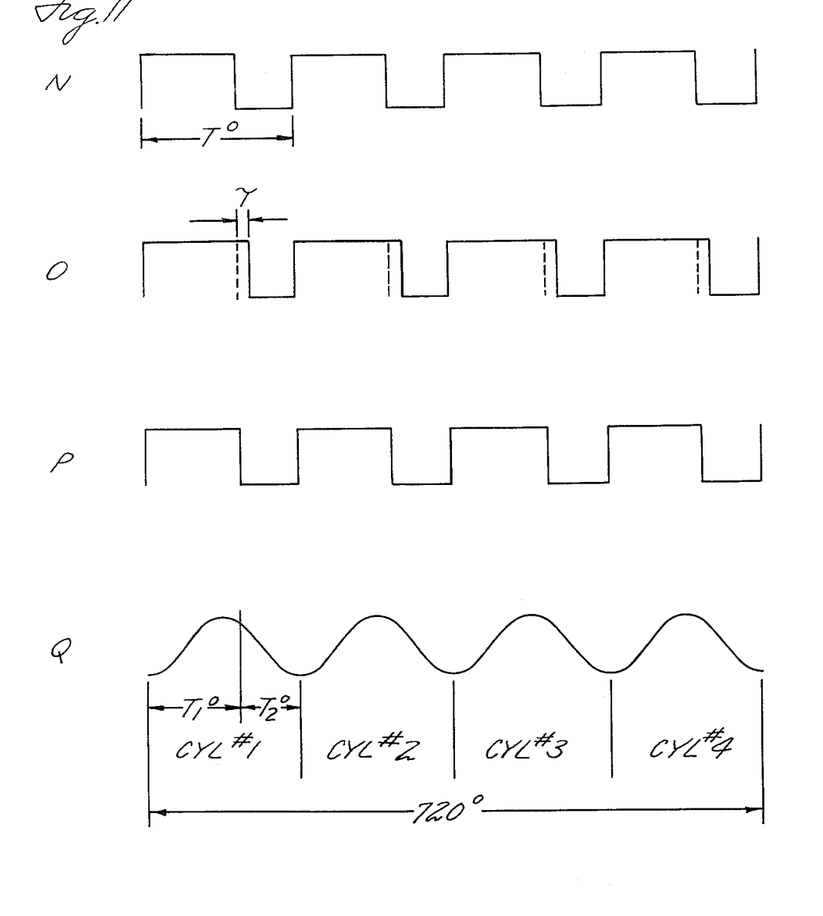
FIG. 11 shows the waveforms produced by the system of FIG. 10.

The present system measures power contribution and dynamic relative compression without defeating the cylinders, and comprises a means to measure the variations in time for the acceleration and compression cycle of each cylinder to occur. Assuming that each cylinder is contributing an equal amount of power to the engine, and assuming a constant engine rpm, the time of the acceleration cycle for each cylinder will be identical, and likewise the time for the compression cycle for each cylinder will be identical. The acceleration cycle is that portion of the ignition or low coil waveform during which the points are open and during which the spark voltage is supplied to the spark plugs and combustion occurs in a cylinder causing the engine to accelerate. The compression cycle for the next cylinder in the firing order is that portion of the ignition or low coil waveform during which the points are closed and during which no spark voltage is supplied, the engine at this time causing compression of the fuel-air mixture. FIG. 11, waveform Q, shows the instantaneous variation in engine rpm with degrees of crankshaft rotation for a four stroke engine, i.e., for 720° of crankshaft rotation. As shown in the FIG., $T_1°$ is the number of degrees during which acceleration of the number 1 piston/cylinder occurs, i.e., between the opening and closing of the points, and $T_2°$ is the number of degrees during which deceleration or compression of the number 2 piston/cylinder occurs, i.e., between the closing and the next opening of the points. Since the number of degrees of rotation of the crankshaft in the engine is equal for the acceleration and compression cycles of each cylinder, an engine in which each cylinder is contributing the same power will take the same time for the acceleration and compression cycles for each cylinder at a constant average rpm.

Assume, however, an engine in which one cylinder is defective and is contributing little or no power to the engine. When spark voltage is fed to this cylinder, little or no acceleration occurs during the acceleration cycle for this cylinder. The engine rpm will either drop slightly, or increase far less than the increase produced by a normal cylinder. Consequently, the time for the acceleration cycle of this cylinder to occur will be longer than that for a normal cylinder. By measuring the times of the acceleration and compression cycles for each cylinder, differences in the power contribution and dynamic relative compression of each cylinder can be determined relative to the other cylinders, and a defective cylinder or other defect can be located. Power contribution and dynamic compression are measured by computing the average angular velocity for each cylinder during the acceleration and the compression cycles.

Figure 10:
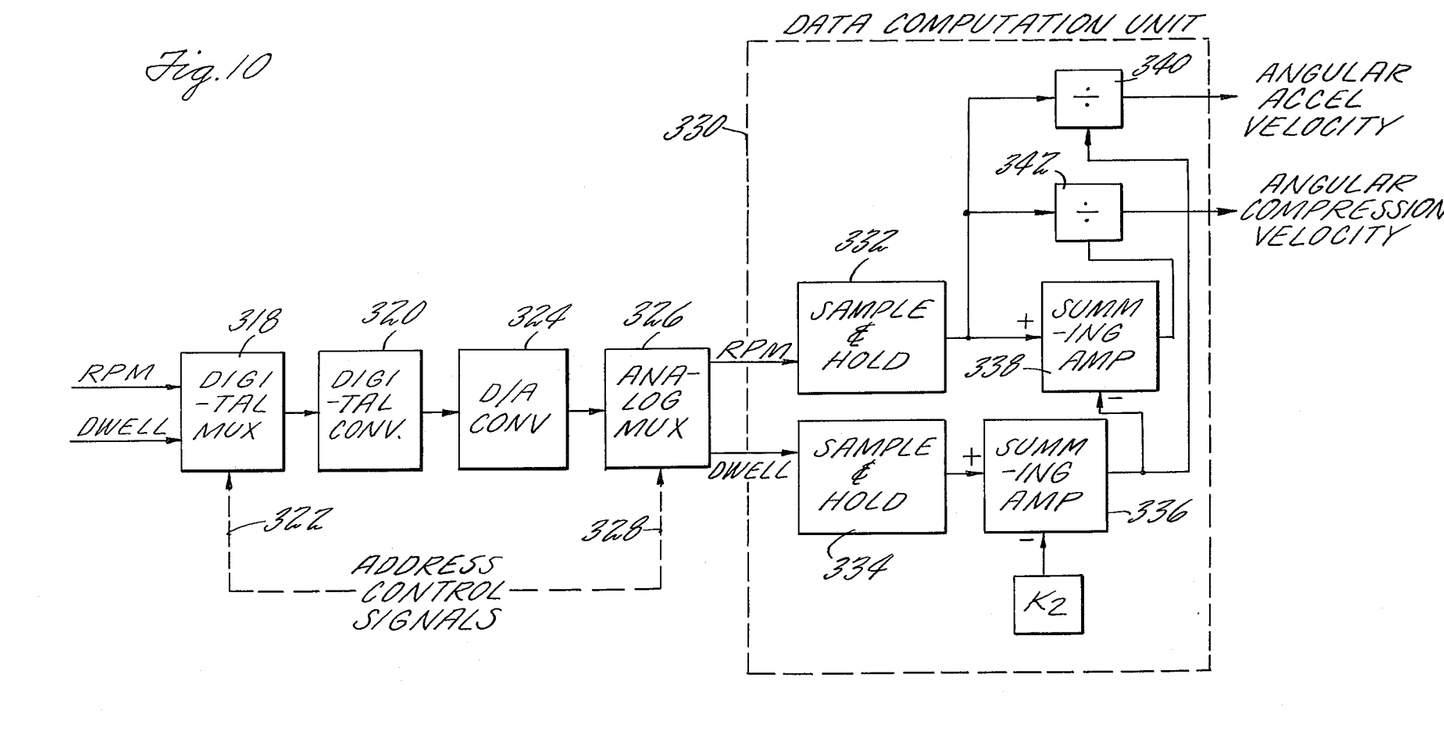
FIG. 10 is a schematic diagram of a system for determining the power contribution of each cylinder.

Referring to FIG. 10 there is shown a modification to the system of FIG. 1 in which average angular velocity is computed for both the acceleration and compression cycles of each cylinder. FIG. 11 shows the waveforms generated in the embodiment of FIG. 10.

The rpm and dwell computation system described with respect to FIGS. 1 and 9 uses a digital counter to count clock pulses during selected times of the low coil signal. Specifically, when the rpm input is selected, the digital counter is enabled upon the leading edge of the low coil pulse and stopped upon the leading edge of the next low coil pulse. When the dwell input is selected, the digital counter is enabled upon the leading edge of the low coil pulse, and stopped on the leading edge of the inverted low coil pulse. A delay τ produced by signal conditioning circuit 32, FIG. 1, is added to the count in the counter when dwell is selected, but does not affect the count in the counter when rpm is selected.

The present invention makes use of the count existing in the digital counter when the rpm and dwell terminals are selected to determine the average angular velocity during the acceleration and compression cycle of each cylinder.

Referring to FIGS. 10 and 11, the rpm and dwell inputs are fed to a digital multiplexer 318 which is addressed by the control signal on line 322, and the inputs are then passed to a digital counter 320 in a manner described in conjunction with FIGS. 1 and 9. The count in counter 320 is converted to an analog signal in digital to analog converter 324, and the analog output voltage is then fed to an analog multiplexer 326 addressed by the control signal on line 328. From the analog multiplexer 326 the rpm and dwell counts are fed into a data computation unit 330. The address control signals on lines 322 and 328 are provided by well-known timing control circuitry which may form part of the data computation unit 330. Both the rpm and dwell counts, in analog format, are fed to sample and hold circuits 332 and 334 respectively within the data computation unit 330.

As explained previously in conjunction with FIG. 1, the count in counter 320 when rpm is addressed is the number of clock pulses between consecutive leading edges of the low coil pulses as shown by T° in waveform N, FIG. 11. The count in counter 320 when dwell is addressed is the number of clock pulses between the leading edge of the low coil pulse, and the leading edge of the inverted low coil pulse, plus the delay time $\tau$ added by signal conditioner 32 of FIG. 1. The count is actually the inverse of dwell as explained previously, and is shown at waveform O, FIG. 11. A constant $K_2$ ($K_2 = \tau$) is subtracted from the dwell count in sample and hold circuit 334 in a summing amplifier 336. The output from summing amplifier 336 is the count $T_1°$.

The rpm count (T°) is fed from sample and hold circuit 332 to a summing amplifier 338 and the output count from summing amplifier 336 ($T_1°$) is subtracted therefrom, the output from summing amplifier 338 being the count $T_2°$ shown at waveform P of FIG. 11.

The angular velocity for each cylinder is computed in data computation unit 330 in accordance with the following equations:

$$\text{angular acceleration velocity} = \frac{T_1°}{T°}, \qquad \text{Equation (4)}$$

and $$\text{angular compression velocity} = \frac{T_2°}{T°} \qquad \text{Equation (5)}$$

where T°, $T_1°$ and $T_2°$ are defined in FIG. 11.

The angular acceleration velocity is computed in divider 340, and the angular compression velocity is computed in divider 342, in the data computation unit 330 of FIG. 10. The angular velocity outputs for each cylinder may be fed to a display unit, where the operator may visually determine variations between the power contribution of each cylinder, or further computations may be performed in data computation unit 330. The computations may be performed in an analog or digital manner. Since the system of FIG. 10 uses only the counts in the counter 320, and the counts vary with the time required for the acceleration and compression cycles, changes in engine rpm as reflected by changes in the count are directly related to the power contributed by each cylinder during the acceleration cycle, and the dynamic relative compression of each cylinder during the compression cycle. Consequently, substantial information relative to engine performance is obtained.

While the invention has been described in terms of a preferred embodiment thereof, it will be apparent to those skilled in the art that numerous changes may be made without departing from the scope of the invention as hereinafter claimed.

I claim:

1. In a diagnostic system for a motor vehicle having an internal combustion engine, said engine having an ignition system for selectively supplying a series of spark voltage pulses to a plurality of spark ignition devices, said voltage pulses exhibiting ringing and large voltage excursions, the improvement of a signal conditioning circuit for said voltage pulses comprising
   a transistor having an emitter, a base and a collector,
   means for biasing the base of said transistor so that said transistor is normally nonconductive,
   a capacitor connected to the collector of said transistor,
   a source of voltage connected to the collector of said transistor and to said capacitor, said capacitor being charged by said voltage source when said transistor is nonconductive,
   a comparator having first and second input terminals and an ouput terminal,
   means connecting said voltage source to the first input terminal of said comparator, and connecting said capacitor to the second input terminal of said comparator, said comparator producing a first voltage output at the output terminal thereof when said capacitor is discharged, and producing a second voltage output at the output terminal thereof when said capacitor is charged to a predetermined voltage level,
   means connecting said series of spark voltage pulses to the base junction of said transistor to cause conduction thereof, said capacitor discharging through said conducting transistor,
   output circuit means connected to the output terminal of said comparator, said output circuit means producing an output signal in the form of a square wave having a leading edge occurring simultaneously with the leading edge of said spark voltage pulses, and having a trailing edge delayed in time from the trailing edge of said spark voltage pulses by a fixed time constant as a function of the charging rate of said capacitor,
   and ignition adapter circuit means connected in series between said ignition system and the base junction of said transistor for preventing conduction of said transistor until said spark voltage pulses attain a preselected voltage magnitude.

2. A signal conditioning circuit as in claim 1 in which said ignition adapter circuit means includes a forward biased diode and a reverse biased Zener diode connected in series.

3. A signal conditioning circuit as in claim 1 and including switch means for bypassing said ignition adapter circuit means.

* * * * *